Figure 1:
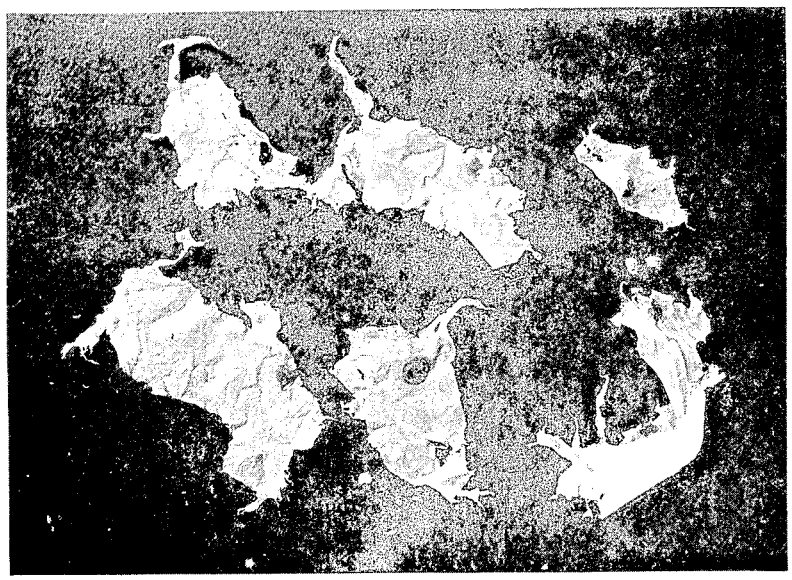

May 31, 1966 — M. J. NEVINS — 3,254,064
MATTING MATERIAL AND PROCESS
Filed May 15, 1964

MICHAEL J. NEVINS
INVENTOR.

BY Delman H. Jansen

AGENT

United States Patent Office 3,254,064
Patented May 31, 1966

3,254,064
MATTING MATERIAL AND PROCESS
Michael J. Nevins, Houston, Tex., assignor to National Lead Company, New York, N.Y., a corporation of New Jersey
Filed May 15, 1964, Ser. No. 377,156
4 Claims. (Cl. 260—87.7)

This application is a continuation-in-part of my copending application, Serial No. 752,660, filed Aug. 1, 1958.

This invention relates to materials having unique matting characteristics, useable for example in plugging crevices in underground workings, for stuffing pillows, and the like.

In many cases of underground operations or workings, such as drilling wells, driving shafts, subterranean grouting, and the like, including workover, treating and cementing operations and the like carried on in such wells and other underground workings, difficulty is encountered because of fractured, creviced, or gravelly formations adjacent to the working or drilling operations. In driving shafts such formations may give trouble because they "leak" air or other pressurizing fluid maintained in the shaft, while in well-drilling operations the drilling fluid may be lost completely to the formation instead of performing its desired functions in the bore hole itself. This is particularly objectionable when the rotary method of drilling wells is used, since then circulation of the drilling fluid must be maintained continuously to the surface of the well. In cementing, workover and many treating operations, likewise, wells and other underground workings are filled with a fluid such as cement, formation-treating fluids and the like which is intended to stay in the bore hole or shaft where it is placed. In the presence of creviced, fractured, gravelly or otherwise abnormally porous formations, however, the fluid may be lost in its entirety.

It is known to combat such loss of fluid by admixing therewith various materials, such as chopped rope, straw, mica, asbestos, sugar-cane fiber, chopped bark, expanded perlite, and a wide variety of similar materials, almost too numerous to tabulate.

Related water shutoff operations occur in and behind dams, reservoirs, ponds, irrigation ditches and canals, and the like, where materials of a general type already described are used generally in an attempt to form a mat capable of holding bentonite and the like, generally in dry or granular form, so as eventually to form a seal.

When experiments are carried out to determine the behavior of these various materials, it is found that each one has some disadvantages and some advantages, and they nearly all differ considerably, one from the other. In particular, the fibrous materials tend to have matting properties, poorly-developed in some and well-developed in others, but at the same time they lack water shut-off properties. This follows from the very nature of a mat of fibers, which indeed in some industries is used as a filter aid, thus giving exactly the opposite effect from what is desired here. On the other hand, the flaky materials, when used against formations which happen to have the right characteristics for forming a seal with the particular flake used, have good water shutoff properties, but these are seldom able to manifest themselves because the flakes, lacking the power of matting like fibers, will seal off only in limited and rather special environments. Attempts at overcoming these disadvantages by mixing both fibers and flakes into the same well-treating or drilling fluid or using them together in dam and pond sealing and the like have not been especially successful, because the presence of flakes interferes with the matting characteristics of the fibers and simultaneously the presence of the fibers interferes with the water shut-off properties of the flakes. It is a fair statement that the ideal sealing medium for the purposes described has not been found or even approached, prior to the present invention. Indeed the very number of materials which have been suggested testifies to this fact.

As will be more clearly set forth hereinbelow, a need likewise exists for a material for use in stuffing pillows and like use in connection with furniture, bedding and the like, which is capable of matting together to form a lightweight, permanent resilient, clean filling material.

An object of the present invention is to provide a material having superior properties for plugging underground crevices of the type described.

Another object of the invention is to provide a superior lost circuation material which can be readily and economically prepared.

A further object of the nivention is to provide a material for plugging underground crevices of the type described which has the almost unique characteristic of both great matting strength and great impermeability.

A further object of the invention is to provide a material capable of matting and still providing a resilient, coherent mass of light weight suitable for stuffing pillows and like structures.

In accordance with the invention, and in particular in accordance with an illustrative embodiment thereof, a solid stretchable, deformable organic polymer in sheet form, and of a type to be more particularly described hereinbelow, is shredded by a tearing process, so that flakes are formed with attached fibrils or tendrils, all as more fully described below. The invention may be more readily understood in connection with the drawings, in which FIGURES 1-4 inclusive show a variety of materials of the class used, processed in a variety of disintegrators, but all showing the characteristic structure developed under the specified conditions, as will be explained in greater detail hereinbelow.

The number of organic polymers which are capable of being formed into thin sheets is quite large, and includes, as is well known, such materials as rubber, cellophane, polyethylene, and many others. Now there is a particular subclass of such organic polymers in pellicular, viz., sheet form, the members of which show the ability of being stretched to a considerable extent and permanently deformed by such considerable stretching, together with stretch orientation giving rise to a fibrous character. This is not true, for example, of sheet rubber, which while it may be stretched considerably, is not substantially permanently deformable by stretching, short of tearing. Again, cellophane sheets are neither stretchable nor deformable as the terms are used here, since the elastic limit in terms of percentage of stretch is very small, beyond which the sheet of cellophane tears, with no deformation otherwise. The particular subclass of sheet-form organic polymers with which this invention is concerned, however, has the property of being both stretchable and permanently deformable by the stretching, with "stretch" or "strain" orientation giving rise to a fibrous character. Examples, cited by way of exemplification and not by way of limitation, are polyethylene, polypropylene, poly-(vinylalcohol), and the copolymer of vinylidene chloride and vinyl chloride, the latter known commercially as "Saran." While I do not wish to be held to any theory of action, I believe that materials of this subclass behave as they do because they are essentially linear polymers with very little cross-linking, and capable of undergoing orientation upon stretching, as has been demonstrated in the literature by X-ray evidence. For convenience, materials of this type will be designated here and in the claims which follow as solid, stretchable, deformable, stretch orientable organic polymers in pellicular form.

The behavior which gives rise to the novel product of my invention occurs when polymers of the type described are provided in sheet, viz, pellicular form having a thickness of from about 1 mil to about 4 mils, that is, about 0.001″ to about 0.004″. Furthermore, this behavior in general is exhibited only within a range of temperature which is specific for the particular polymer chosen, and in general has a lower limit of about 10° C. for all of the named polymers, and an upper limit of about 40° C. for polyethylene, and about 50° C. for the others. At a temperature less than the lower limit named, the polymers tend to be too brittle and thus are not permanently stretch deformable; while above the upper limits named, the polymers are so close to their softening points that they pull apart without any strain orientation. It will be understood, therefore, that in the teaching which follows of the method of making my novel products, the mechanical operations are always carried out within the temperature ranges just given hereinabove.

Now I have discovered that when sheet polymers of the type described are shredded in comminuting apparatus of the type normally known commercially as hammermill disintegrators, wherein the sheet material is pulled apart rather than sheared, as for example by a scissors, and within the temperature ranges hereinbefore specified, then flakes are formed each with a multiplicity of prolongations extending from the flake portion, with the prolongations having the form of tendrils. As a result of the stretching undergone by the tendrils during the pulling process, they developed considerable tensile strength, doubtless as a result of the stretch orientation of the polymer chains constituting the polymeric or plastic material.

Hammermills are ideally suited to the production of the flakes in accordance with my invention. Hammermills are well-known to the chemical process industry, and several types are shown and described on pages 23–25 of the book "Chemical Process Machinery" by Riegel, second edition, New York 1953. Essentially, a hammermill consists of a number of short rods or plates or knives, termed "hammers," attached either rigidly or pivotally to a rotating shaft and maintained at a slight distance from a screen or slot assembly forming part or all of the enclosure for the mill proper. The shaft carrying the hammers is rotated at a high rate of speed, generally from 1500 r.p.m. to as high as 10,000 r.p.m. and even higher, and the material to be disintegrated is torn apart by the hammers, and, having been reduced in size, is discharged through the screen or slot assembly. The characteristic feature of a hammermill is that when operated on sheet material of the type described, it is capable of performing a tearing operation. Thus, the flakes with tendrils attached can be made in a wide variety of hammermills, it merely being necessary to use a screen or slot assembly of the proper size to give the desired flake size, and moreover it is advisable to use hammers of the bar or knife type as distinguished from heavy, yoke type hammers employed in crushing rocks and the like. Most commercial hammermills are adapted to receive hammers of various styles and sizes, so that this is readily accomplished.

The best product in accordance with my invention is obtained with a screen opening of the hammermill of from ⅜″ to 1″. These may be circular or square or even polygonal. Where a hammermill with slots is used, these may again have an opening of from ⅜″ to 1″.

Figure 2:

As an example of essentially similar products obtainable from widely different hammermills, FIGURES 1 and 2 may be noted. These are low-power photomicrographs, as are FIGURES 3 and 4, of the flakes produced in accordance with the invention, taken at a magnification of two diameters in the drawings as filed, which corresponds to a magnification of about 1.33 diameters in the drawing accompanying the printed patent. FIGURE 1 is a photomicrograph at this magnification of the product obtained by passing polyethylene sheeting having a thickness of 0.0012 inch to 0.0015 inch through a Rietz disintegrator, of the RA type, 6″ diameter, as described on page 1540 of Chemical Engineering Catalog, 1958, Reinhold Publishing Company, New York, and corresponding to the general type of hammermill shown in U.S. Patents Nos. 2,082,419, 2,153,590 and 2,325,426. A ½″ square opening screen was used. FIGURE 2 shows the product obtained by passing the same polyethylene sheeting through a Williams hammermill of considerably larger size and rather different construction, as shown on page 1889 of the above-mentioned publication. This was a 40″ by 50″ Williams hammermill fitted with the so-called "Ideal" type hammer shown in Figure 1113 of page 20 of Bulletin 707 of the manufacturer, Williams Patent Crusher and Pulverizer Company, Inc., St. Louis, Missouri. Again a ½″ screen was used. In both cases, it will be noted that the characteristic structure described and claimed herein was achieved, namely a flake of irregular shape and crumpled as a result of the mechanical treatment, and bearing numerous attached tendrils or fibers extending from the flake proper.

Figure 3:
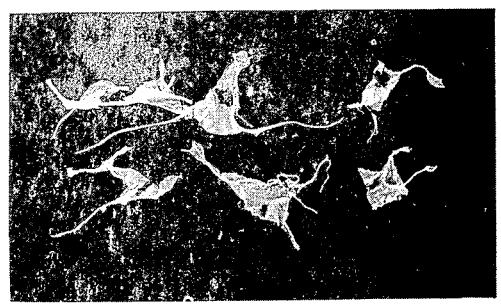

FIGURE 3 shows the product obtained by passing polyvinyl-alcohol film of 0.002″ thickness through a Rietz disintegrator. The fibrils are well-developed in this material, and are clearly seen in the photomicrograph. This particular material is soluble in water, and indeed the sheet material which represented the hammermill sheet is commercially sold as a water-soluble packaging material. The product made in accordance with the invention from this plastic substance, i.e., poly(vinylalcohol), is accordingly particularly suited to use in oil base drilling muds, or in grouting operations wherein an oil is used as a placement fluid. One particular use for oily fluids in wells of the type described is in gun-perforating operations, wherein it is desired to maintain a non-aqueous, non-penetrating fluid in the well and surrounding the perforating gun. The product illustrated in FIGURE 3 is remarkably well adapted for this use, particularly since it may be removed entirely from the well and perforations and other artificially induced fractures by the normal flow or oil and water produced from the formations perforated and fractured, as well as aqueous washing liquids deliberately introduced following the perforating or like operation.

Figure 4:

FIGURE 4 shows the product obtained on passing the copolymer of vinylidene chloride and vinyl chloride in sheet form through a Rietz disintegrator. The material was 0.001″ thick, and sold by the Dow Chemical Company under the trade name of "Saran." Again, the characteristic structure of a flake portion with attached tendrils or fibrils may be clearly seen. (Occasionally this material is referred to as the copolymer of polyvinylidene chloride and polyvinyl chloride, although this nomenclature is not strictly correct.)

The products produced in accordance with the invention of course are quite limp, and in the figures they were photographed lying on a flat horizontal surface. The dimensions of the products appearing in the figures may be readily determined by measurement with a ruled scale, bearing in mind the magnification of the figures hereinabove set forth. It will be seen, thus, that the units (consisting of a flake with several tendrils attached) of FIGURE 1 range from a minimum size of about ¼″ by ½″ to about ½″ by 1″; that those of FIGURE 2 range from approximately ¼″ by ¼″ to ½″ by 1″; that those of FIGURE 3 range from about ³⁄₃₂″ by ¼″ to ¼″ by ½″; and that those of FIGURE 4 range from about ³⁄₃₂″ by ½″ to ¼″ by ¾″. Generally speaking, the products of my invention useful for the purposes set forth will have a minimum dimension of about ³⁄₃₂″ and a maximum dimension of about 1″, viewed as laid on a horizontal flat surface as in the figures.

It will be apparent, not only from the figures but from the manner of producing my novel products which has been set forth, that the product obtained consists of a number of discrete units, each of which consists of a flake portion, representing a remnant of the original sheet or pellicle, having attached thereto a multiplicity of tendrils, naturally formed from the same body or sheet of material, each of the tendrils being attached to the body or flake portion at one end, the remainder of each tendril being free from the flake or body portion. The tendrils of course represent the remnants of the connections between the flakes as they are turn apart in the hammermill, the tendrils consisting of highly stretch-oriented portions of the polymer, and therefore having considerable tensile strength.

The unique characteristics of my inventive product lend it to the ready formation of a resilient, lightweight matting which is especially well adapted for stuffing pillows. The tendrils tend to lock the aggregate of units into a more or less single, coherent mass after a certain amount of usage as a pillow, and this greatly assists in preventing lumping of pillows stuffed with this material, and even inhibits leakage of the stuffing should the pillow or pillows' ticking be torn or become unsewn. The unitary combination of tendrils with a flake portion likewise prevents extreme compaction in this particular use, so that resilience remains even after long usage.

It will be evident that the invention is a broad one, and while specific embodiments have been described, the invention is capable of being carried out with a variety of materials and by a variety of disintegrating apparatus. It is intended, accordingly, that the subjoined claims are to be interpreted broadly.

I claim:

1. An article of manufacture consisting of the product obtained by passing through a hammermill having a screen opening of from about ⅜ inch to about 1 inch sheets of thickness of about 0.001 to about 0.004 inch of an organic polymer chosen from the class consisting of polyethylene, polypropylene, poly(vinylalcohol) and the copolymer of vinylidene chloride and vinyl chloride at a temperature at which said polymer is capable of permanent stretch deformation and stretch orientation, said product consisting of discrete units consisting entirely of the said chosen polymer, each of which consists of a flake portion bearing a multiplicity of tendrils attached thereto at one end of each tendril, the remaining portion of each tendril being free of said flake, and each of said units having overall dimensions within the range of about 3/32 inch by ¼ inch to about ½ inch by 1 inch, viewed as laid on a flat surface.

2. The article of manufacture in accordance with claim 1 wherein said temperature is within the range of about 10° C. to about 40° C. where said polymer is polyethylene, and from about 10° C. to about 50° C. when said polymer is other than polyethylene.

3. The process of making a matting material comprising passing through a hammermill having a screen opening of from about ⅜ inch to about 1 inch sheets of thickness of about 0.001 to about 0.004 inch of an organic polymer chosen from the class consisting of polyethylene, polypropylene, poly(vinylalcohol) and the copolymer of vinylidene chloride and vinyl chloride at a temperature at which said polymer is capable of permanent stretch deformation and stretch orientation, so as to produce a product consisting of discrete units consisting entirely of the said chosen polymer, each of which consists of a flake portion bearing a multiplicity of tendrils attached thereto at one end of each tendril, the remaining portion of each tendril being free of said flake, and each of said units having overall dimensions within the range of about 3/32 inch by ¼ inch to about ½ inch by 1 inch, viewed as laid on a flat surface.

4. The process in accordance with claim 3 wherein said temperature is within the range of about 10° C. to about 40° C. where said polymer is polyethylene, and from about 10° C. to about 50° C. when said polymer is other than polyethylene.

References Cited by the Examiner
UNITED STATES PATENTS 2,912,380   11/1959   Groves _____ 252—8.5

JOSEPH L. SCHOFER, *Primary Examiner.*